United States Patent [19]

Chornet et al.

[11] Patent Number: 4,767,543
[45] Date of Patent: Aug. 30, 1988

[54] OXIDATION OF WASTEWATERS

[75] Inventors: Esteban Chornet, Sherbrooke; Line Jaulin, Ste-Foy, both of Canada

[73] Assignee: Universite de Sherbrooke, Sherbrooke, Canada

[21] Appl. No.: 929,774

[22] Filed: Nov. 13, 1986

[51] Int. Cl.⁴ .............................................. C02F 1/72
[52] U.S. Cl. .................................. 210/759; 210/761; 210/762; 210/909
[58] Field of Search ............... 210/761, 762, 759, 763, 210/909

[56] References Cited

U.S. PATENT DOCUMENTS

| | | | |
|---|---|---|---|
| 3,661,778 | 9/1972 | Pradt | 210/761 |
| 3,852,192 | 3/1974 | Fassell et al. | 210/761 |
| 3,907,678 | 9/1975 | Pradt et al. | 210/761 |
| 4,012,321 | 3/1977 | Koubek | 210/761 X |
| 4,294,706 | 10/1981 | Kakihara et al. | 210/762 |
| 4,670,162 | 6/1987 | Robey | 210/761 |

FOREIGN PATENT DOCUMENTS 1132850 10/1982 Canada ............................ 210/761
2070580 9/1981 United Kingdom ............... 210/761

Primary Examiner—Tom Wyse
Attorney, Agent, or Firm—Cushman, Darby & Cushman

[57] ABSTRACT

The present invention relates to an improved process for the wet oxidation of water soluble organic pollutants or of an aqueous suspension of organic pollutants. In the contacting of an oxidizing gas and a polluted aqueous phase, the improvement comprises forming a fine mist of the polluted aqueous phase in the presence of the oxidizing gas, thereby increasing the interfacial area between the gas and the polluted aqueous phase. Then the formed mist is introduced into a heated reaction chamber under pressure, thereby enhancing the rate of the destructive oxidation of the organic pollutant by the increase in mass transfer between the gaseous phase and the aqueous mist, the reaction temperature being selected to favor rapid destruction of the pollutant without the formation of stable intermediate reaction products. After destruction of the pollutants, the reaction mixture is allowed to flash off at a pressure lower than the reaction pressure.

6 Claims, 2 Drawing Sheets

Flow diagram of the entire wastewater oxidation process

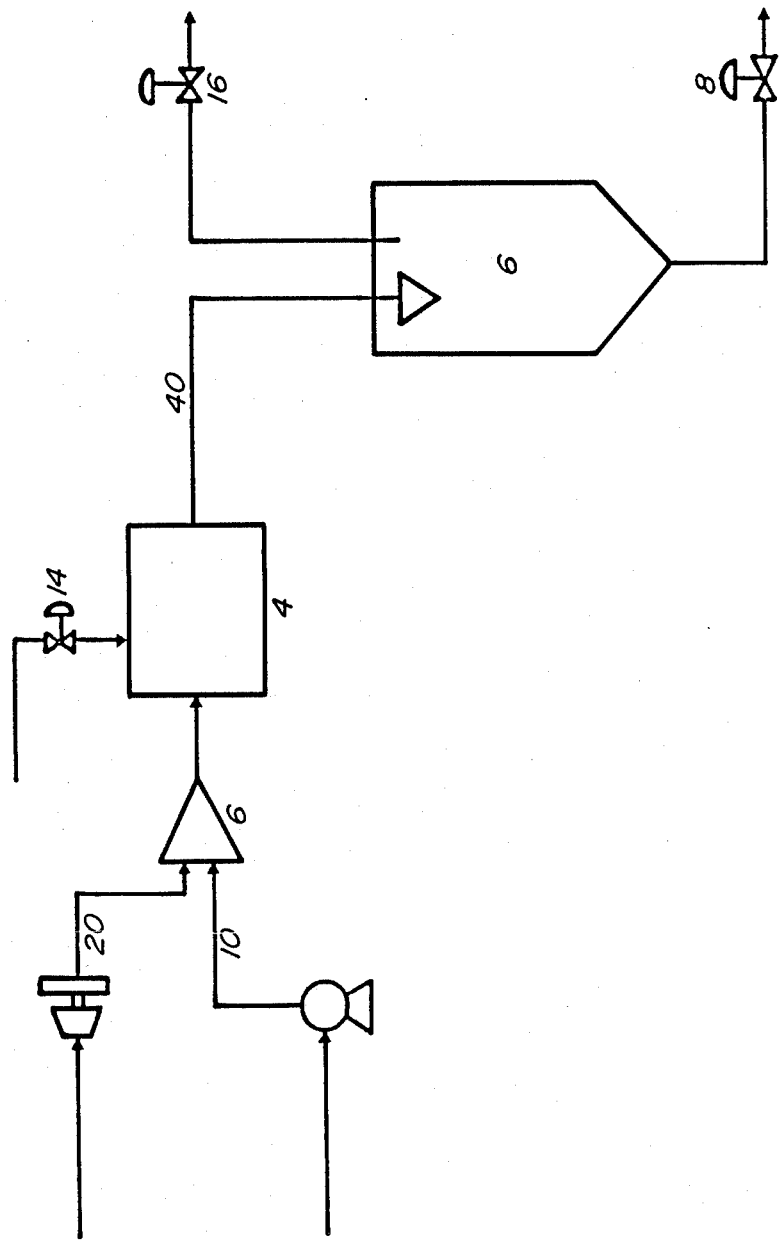
FIG. 1  Flow diagram of the entire wastewater oxidation process

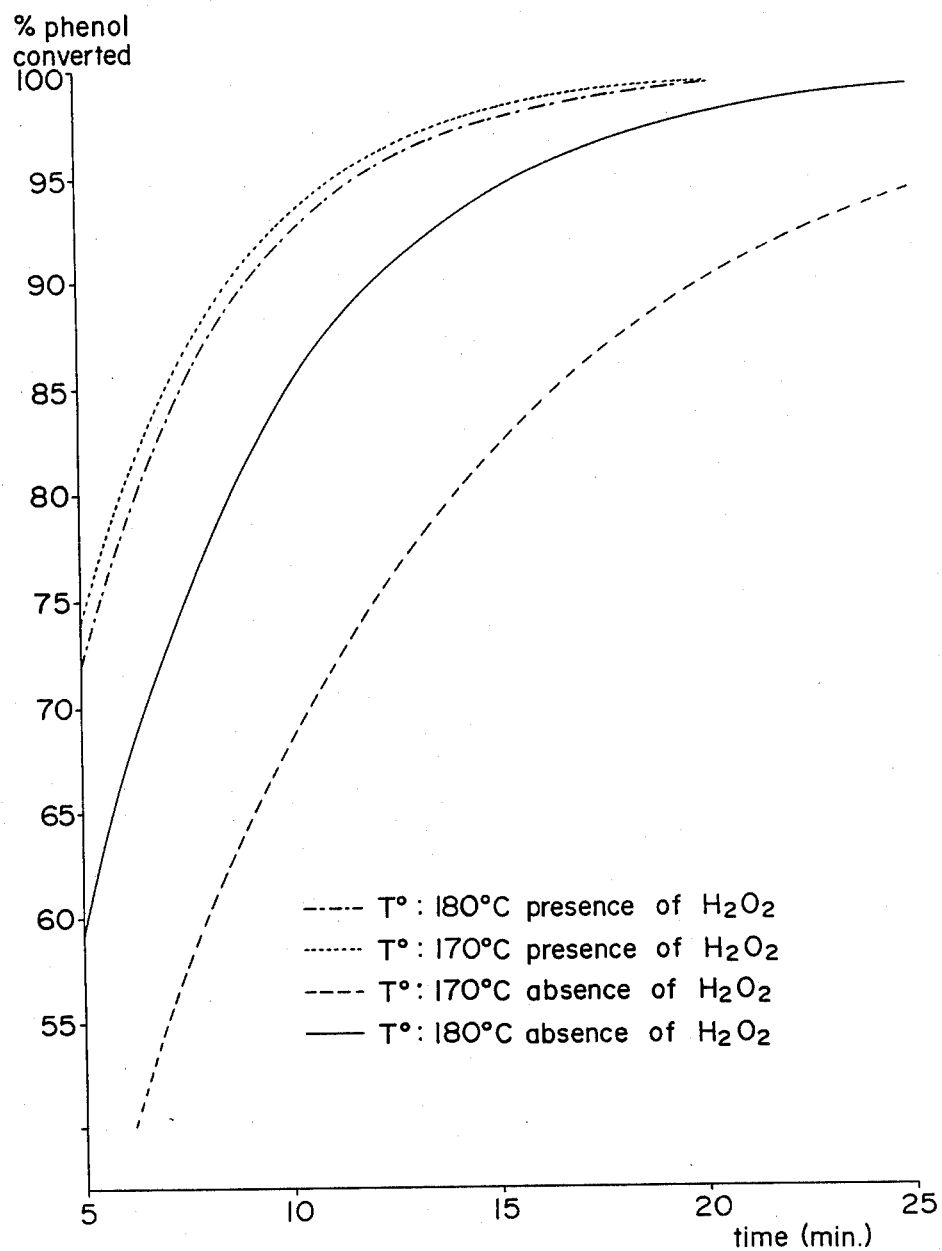

OXIDATION OF WASTEWATERS

BACKGROUND OF THE INVENTION

Phenolated and hydroxylated aromatic compounds are one of the main sources of industrial pollution.

Phenolated residual water is found in the effluents of industries involved in the manufacturing of pharmaceutical products, plastic materials, coals, tars and their derivatives, pesticides and dyestuff among others.

The residual phenol concentrations vary widely, depending on the type of industry involved. These concentrations may attain several grams per liter and since it is known that phenols are toxic to living organisms even at very low concentration levels, it has become necessary to develop purification techniques for treating phenolated wastewaters.

However, these techniques have not been very numerous, have almost always involved substantial investments, and, above all, they have not been totally effective. So far, the most effective way to dispose of soluble or suspended organic pollutants in aqueous systems has been to chemically oxidize the aromatic contents either totally to carbon dioxide or partially to acids which are easily degradable by further action or microorganisms.

In the light of the numerous studies performed on the oxidation of phenolated wastewaters, it can be concluded that there are two key aspects which have to be looked upon. They are the chemical steps leading to destruction of the toxic soluble organic material and the configuration of the reactor system in which contacting between liquid and gas phases is made.

The chemical steps leading to oxidation of aromatic compounds are relatively well understood. Basically, oxidation is initiated by the formation of hydroperoxide radicals leading to hydroquinones and quinones and followed by further ring opening and destruction of the aromatic structures.

Since oxidation is undoubtedly the most effective treatment of phenolated wastewaters, many variations of this method have been developed. It is clear although that a flexible and inexpensive purification process has long been sought after, and numerous publications attest these facts.

It has been proposed to effect oxidation treatment by ozone or permanganate. However, these two products are extremely costly and the use of permanganate results in the production of large quantities of undesirable sludge.

Treatment by chlorine has also been considered to be interesting, but it frequently produces toxic chlorophenols and this opposes the achievement of the desired aim, which is precisely to avoid the formation of such undesirable intermediates.

Oxidation using hydrogen peroxide mixed with a salt of ferrous iron as catalyst, conventionally known as the Fenton reagent, has also been proposed and this process was found to be among the most effective ones. However, it presents some disadvantages, namely the necessity of introducing ferrous iron which must be separated after processing, acid pH that is strong enough to attack the reactor walls, very high production costs and finally hydroxylation of the hydrocarbides which may be contained in the wastewater to be purified.

The concommittant use of UV light, temperature and acoustic energy to trigger the free radical oxidation mechanisms has also been reported. Finally, direct wet air oxidation using $HSO_5$ as a catalyst has been reported and applied to the oxidation of toxic phenolic compounds in wastewaters.

In the use of gaseous oxygen with or without a catalyst, the contacting between the wastewater and the oxygen containing gaseous phase is almost always effected by bubbling the gas through the liquid using a variety of agitation systems. However, it will be understood that mass transfer limitations are encountered in current technologies since the gaseous oxygen has to diffuse through the gas-liquid interface using the inherently low external surface area available in the gas bubbles. Low oxidation rates are thus obtained necessitating long treatment times. This results in massive technologies having significant investing and operating costs.

Thus, in the light of existing technology, it would be highly desirable to provide a new method for treating contaminated wastewaters without leading to undesirable stable reaction intermediates that would be rendered more efficient by improving mass transfer between the contaminated waste and the oxidizing gas.

SUMMARY OF THE INVENTION

The invention is related to an improved process for the wet oxidation of water soluble organic pollutants or of an aqueous suspension of organic pollutants. In the contacting of an oxidizing gas and a polluted aqueous phase, the improvement comprises forming a fine mist of the polluted aqueous phase in the presence of the oxidizing gas, thereby increasing the interfacial area between the gas and the polluted aqueous phase. Then the formed mist is introduced into a heated reaction chamber under pressure, thereby enhancing the rate of the destructive oxidation of the organic pollutant by the increase in mass transfer between the gaseous phase and the aqueous mist, the reaction temperature being selected to favor rapid destruction of the pollutant without the formation of stable intermediate reaction products. After destruction of the pollutants, the reaction mixture is allowed to flash off at a pressure lower than the reaction pressure.

IN THE DRAWINGS

FIG. 1 represents a flow diagram of the entire wastewater oxidation process.

FIG. 2 represents effective oxidation times of phenols in the presence of oxygen using the process of the present invention at different temperatures with or without a hydrogen peroxide catalyst.

DESCRIPTION OF THE PREFERRED EMBODIMENT

Referring now to FIG. 1, the filtered wastewater feed stream is pumped through a line 10 which can act as a preheater via indirect heating, before mixing with the compressed oxidizing gas coming through another line 20 takes place into an injector 6. The gas-liquid mixture goes to a tubular reaction chamber 4, where it is introduced in the form of a fine mist and rapidly heated up to a temperature ranging from 140° C. to 200° C. at pressures ranging from 2 to 4.5 MPa for a prescribed period of time ranging from 0.1 to 3 minutes. The tubular reactor 4 can be heated either indirectly or by a live steam addition system 14. The outlet of the reaction chamber 4 then goes through a line 40 to a flash drum 6 in order to bring the system down to the chosen discharge pressure and temperature. The flashed steam is recovered through a valve 16 whereas the treated wastewater leaves the system through another valve 8. Recycle loops or a series of injector-reactors are possible depending upon the severity of the treatment chosen. Carbon dioxide is then the only contaminant of the steam since total oxidation of the organic matter has taken place.

Moreover, it is important to note that the addition of a suitable liquid catalyst such as $H_2O_2$ to the reaction system can result in considerable increase of the reaction rates, that being due to an energetically more formable initiation path. The effect of the catalyst on the reaction rate can be easily visualized by comparing the results shown in Table I.

It is also to be noted that an important feature of this invention is that large bubbling tanks commonly used for wastewater treatment have now been replaced by a compact reactor that can be transported to the wastewater storage site, thus avoiding unnecessary transportation of hazardous chemicals.

However, the main features of the present invention remain the improved contacting between the oxidizing gas and the organic pollutant which provides for excellent waste destruction at low costs and the absence of formation of undesirable intermediates or introduction of undesirable substances.

Thus, it has been appreciated that a striking advantage of the present invention is that it provides for the efficient elimination of phenolic compounds to a concentration ranging from between 10 to 30 mg/l in a cost efficient manner and by a portable apparatus. The phenol concentration of 10 to 30 mg/l is an acceptable level by environmental regulations for disposal of such wastewaters in sewers.

After that 10 to 30 mg/l level has been reached, a second purifying technique such as activated carbon or biological treatment either of which is usually provided by municipalities for the treatment of sewage waters can then be used to remove the remaining phenolic compounds. It is to be reminded that activated carbon even though it is very efficient can only be used for treating low phenolic concentration. This is the reason why other techniques like the techniques of the present invention need to be implemented for the treatment of higher phenolic concentrations. The cost of using the combined techniques involves costs sharing by both the industry, which is reducing the high phenolic contents of its wastewaters down to concentrations lower than 30 mg/l and the municipality which is treating the low phenolic concentration wastewaters in the conventional water treatment plant. These features constitute a major step forward as far as organic waste disposal is concerned.

The present invention will be more readily understood by referring to the following Examples which are given to illustrate rather than limit the scope of the invention.

EXAMPLE 1

An aqueous solution containing 1000 mg/l of phenol was pumped at a rate of 0.7 l/min. using a MH32C high pressure pump, preheated using an electrically heated tubular heat exchanger, and then injected into an injector/mixer having a central jet orifice of 0.016 inch and two peripheral orifices of 0.035 inch for oxygen introduced corresponding to a multiple of the stoichiometric amount needed to oxidize the phenol. The intimately mixed gas/liquid phase was then introduced into a tubular reaction chamber (volume 0.86 l and diameter 0.5 inch) which had an internal temperature of 145° C. and an internal pressure of 2.6 MPa for a period of time lower than three minutes. After treatment, the solution was flashed via a fixed orifice into a flash drum reservoir where it was immediately cooled to 100° C. Steam and non-condensible gases were then released and steam was later condensed. The resulting liquid was then analyzed by chromatography. Results are shown in Table I.

EXAMPLES 2–4

The same procedure as in Example 1 was followed, the only modification being the internal reaction chamber temperature, which was respectively maintained at 160°, 170° and 180° C. Results are shown in Table I.

EXAMPLE 5

The same procedure as in Example 1 was followed using a reaction chamber in which a solid $CaO/Cr_2O_3$ catalyst (Harshaw, 3.5% CuO, 38% $Cr_2O_3$, 10% BaO in 1/16 inch pellets) was embedded. However, the catalyst performed poorly, even lowering the conversion rates obtained through direct oxidation. This lowering could be due to a decrease of the interfacial area between gas and liquid droplets caused by rapid coalescence of the mist when in contact with the catalyst bed. Thus, the poor conversion rates observed with the solid catalyst tend to confirm that the reaction is taking place in the liquid phase.

EXAMPLES 6–7

In Examples 6 and 7, the same procedure as in Example 1 was repeated on phenolic aqueous solution containing hydrogen peroxide at a concentration of $9.8 \times 10^{-3}$ mole/l. The internal reaction chamber temperature was maintained at 170° for Example 6 and 180° C. for Example 7. As it can be seen in Table I, a higher conversion rate was observed at 170° C. It could be speculated that at 180° C., fast decomposition of the hydrogen peroxide occurs, thus leading to lower rates.

TABLE I

| | Phenol conversion times at different temperatures with and without a $H_2O_2$ catalyst | | | | | |
|---|---|---|---|---|---|---|
| Example | Initial phenol (mg/l) concentration | Initial $H_2O_2$ (mol/l) concentration | Conversion (°C.) temperature | Conversion time (min.) | Final phenol (mg/l) concentration | % Phenol converted |
| 1 | 1000 | 0 | 145 | 97.3 | 10 | 99 |
| 2 | 1000 | 0 | 160 | 37.8 | 10 | 99 |
| 3 | 1000 | 0 | 170 | 26.3 | 10 | 99 |
| 4 | 1000 | 0 | 180 | 17.9 | 10 | 99 |
| 6 | 1000 | $9.80 \times 10^{-3}$ | 170 | 16.9 | 10 | 99 |
| 7 | 1000 | $9.80 \times 10^{-3}$ | 180 | 11.9 | 10 | 99 |

What is claimed is:

1. In a process for the wet oxidation of water soluble organic pollutants or an aqueous suspension of organic pollutants, the improvement which comprises forming a fine mist of a polluted aqueous phase in the presence of an oxidizing gas, thereby increasing the interfacial area between the gas and the polluted aqueous phase, introducing the formed mist into a heated reaction chamber under pressure, thereby enhancing the rate of the destructive oxidation of the organic pollutant by the increase in mass transfer between the gaseous phase and the aqueous mist, the reaction temperature being selected to favor rapid destruction of the pollutant without the formation of stable intermediate reaction products and after destruction of the pollutant allowing the reaction mixture to flash off at a pressure lower than the reaction pressure.

2. The process of claim 1, wherein hydrogen peroxide is added in the aqueous phase of the pollutant thereby favoring an enhanced formation of free radicals leading to rapid destruction of the organic pollutants.

3. The process of claim 2, wherein the amount of $H_2O_2$ is $10^{-2}$ mole per liter of wastewater or less.

4. The process of claim 1, wherein the organic pollutant is phenol.

5. The process of claim 1, wherein the reaction temperature ranges between 140° and 200° C.

6. A process as set forth in claim 1 in which the oxidizing gas consists essentially of oxygen.

* * * * *